US012793903B2

(12) United States Patent
Yoo

(10) Patent No.: US 12,793,903 B2
(45) Date of Patent: Nov. 10, 2026

(54) MULTILAYER ELECTRONIC COMPONENT

(71) Applicant: SAMSUNG ELECTRO-MECHANICS CO., LTD., Suwon-si (KR)

(72) Inventor: Jin Yeop Yoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 233 days.

(21) Appl. No.: 18/830,814

(22) Filed: Sep. 11, 2024

(65) Prior Publication Data

US 2025/0157742 A1 May 15, 2025

(30) Foreign Application Priority Data

Nov. 10, 2023 (KR) ........................ 10-2023-0154962

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/232* (2013.01)

(58) Field of Classification Search
CPC ........ H01G 4/008; H01G 4/012; H01G 4/232; H01G 4/252; H01G 4/2325; H01G 4/30
See application file for complete search history.

(56) References Cited

U.S. PATENT DOCUMENTS

2018/0174753 A1* 6/2018 Terashita ............... H01G 4/008
2020/0168397 A1 5/2020 Ryoo et al.
(Continued)

FOREIGN PATENT DOCUMENTS

JP 2-248020 A 3/1990
JP 2003-197460 A 7/2003
(Continued)

OTHER PUBLICATIONS

Extended European Search Report dated Mar. 4, 2025 issued in corresponding European Patent Application No. 24200004.0.

*Primary Examiner* — Nathan Milakovich
(74) *Attorney, Agent, or Firm* — Morgan, Lewis & Bockius LLP

(57) ABSTRACT

A multilayer electronic component includes: a body including a dielectric layer and internal electrodes, and having first and second surfaces opposing each other, third and fourth surfaces opposing each other, and fifth and sixth surfaces opposing each other; an external electrode including a connection portion disposed on the third or fourth surface and a band portion extending onto the first and second surfaces from the connection portion. The external electrode includes a lower electrode layer disposed at the connection and band portions, an intermediate electrode layer disposed at the band portion, and an upper electrode layer in contact with the lower and the intermediate electrode layers at the connection and band portions, respectively. The lower electrode layer includes Cu, the intermediate electrode layer includes Ag, and an alloy layer including a Cu—Ag alloy is disposed at an interface between the lower and the intermediate electrode layers.

24 Claims, 6 Drawing Sheets

100

(51) Int. Cl.
*H01G 4/012* (2006.01)
*H01G 4/232* (2006.01)

(56) References Cited

U.S. PATENT DOCUMENTS

| | | | | |
|---|---|---|---|---|
| 2021/0065984 | A1 | 3/2021 | Oh et al. | |
| 2021/0343475 | A1 | 11/2021 | Takeuchi | |
| 2021/0366654 | A1 | 11/2021 | Iguchi et al. | |
| 2023/0019604 | A1 | 1/2023 | Uchida et al. | |
| 2023/0207205 | A1 | 6/2023 | Oh et al. | |
| 2024/0186069 | A1* | 6/2024 | Lee | H01G 4/232 |
| 2025/0157739 | A1* | 5/2025 | Jeong | H01G 4/2325 |
| 2025/0166917 | A1* | 5/2025 | Kim | H01G 4/30 |

FOREIGN PATENT DOCUMENTS

| | | | |
|---|---|---|---|
| JP | 2021-176181 | A | 11/2021 |
| JP | 2021-182599 | A | 11/2021 |
| JP | 2023-009629 | A | 1/2023 |
| KR | 10-1790812 | B1 | 10/2017 |
| KR | 10-2019-0116166 | A | 10/2019 |
| KR | 10-2019-0121224 | A | 10/2019 |
| KR | 10-2023-0097508 | A | 7/2023 |

* cited by examiner

MULTILAYER ELECTRONIC COMPONENT

CROSS-REFERENCE TO RELATED APPLICATION(S)

This application claims the benefit of priority to Korean Patent Application No. 10-2023-0154962 filed on Nov. 10, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on a printed circuit board of any of various electronic products, such as an imaging device, including a liquid crystal display (LCD) or a plasma display panel (PDP), a computer, a smartphone, or a mobile phone, to serve to charge or discharge electricity therein or therefrom. The MLCC may be used as a component of any of various electronic apparatuses because the MLCC is small, has high capacity, and is easily mounted.

In recent years, an external electrode is being thinned to miniaturize the MLCC. However, as the external electrode becomes thinner, external moisture or plating solution may easily penetrate into a capacitor body. In addition, as the external electrode becomes thinner, a crack may occur in the MLCC due to a bending stress occurring while the MLCC is mounted on the PCB.

Accordingly, there is a need for research on a structure of the external electrode for preventing lower moisture resistance reliability of the MLCC by blocking a moisture penetration path, which is shortened by the thinner external electrode, and improving a bending strength of the MLCC.

SUMMARY

An aspect of the present disclosure is to provide a multilayer electronic component having improved moisture resistance reliability and bedding strength.

An aspect of the present disclosure is to provide a multilayer electronic component having improved capacitance and equivalent series resistance (ESR) feature.

However, the present disclosure is not limited to the description described above, and may be more readily understood in the description of exemplary embodiments of the present disclosure.

According to an aspect of the present disclosure, a multilayer electronic component includes: a body including a dielectric layer and internal electrodes alternately disposed while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; external electrodes respectively including a connection portion disposed on the third or fourth surface and a band portion extending onto portions of the first and second surfaces from the connection portion, wherein the external electrode includes a lower electrode layer in contact with the internal electrode and disposed at the connection portion and the band portion, an intermediate electrode layer disposed at the band portion and disposed on the lower electrode layer, and an upper electrode layer in contact with the lower electrode layer at the connection portion and in contact with the intermediate electrode layer at the band portion, the lower electrode layer includes copper (Cu), the intermediate electrode layer includes silver (Ag), and an alloy layer including a copper (Cu)-silver (Ag) alloy is disposed at an interface between the lower electrode layer and the intermediate electrode layer.

According to an aspect of the present disclosure, a multilayer electronic component includes: a body including a dielectric layer and internal electrodes alternately disposed while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; external electrodes respectively including a connection portion disposed on the third or fourth surface and a band portion extending onto portions of the first and second surfaces from the connection portion, wherein the external electrode includes a lower electrode layer in contact with the internal electrode and disposed at the connection portion and the band portion, an intermediate electrode layer disposed at the band portion and disposed on the lower electrode layer, and an upper electrode layer in contact with the lower electrode layer at the connection portion and in contact with the intermediate electrode layer at the band portion, the lower electrode layer includes a first metal including copper (Cu) as a main component thereof, and the intermediate electrode layer includes a second metal including silver (Ag) as a main component thereof.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
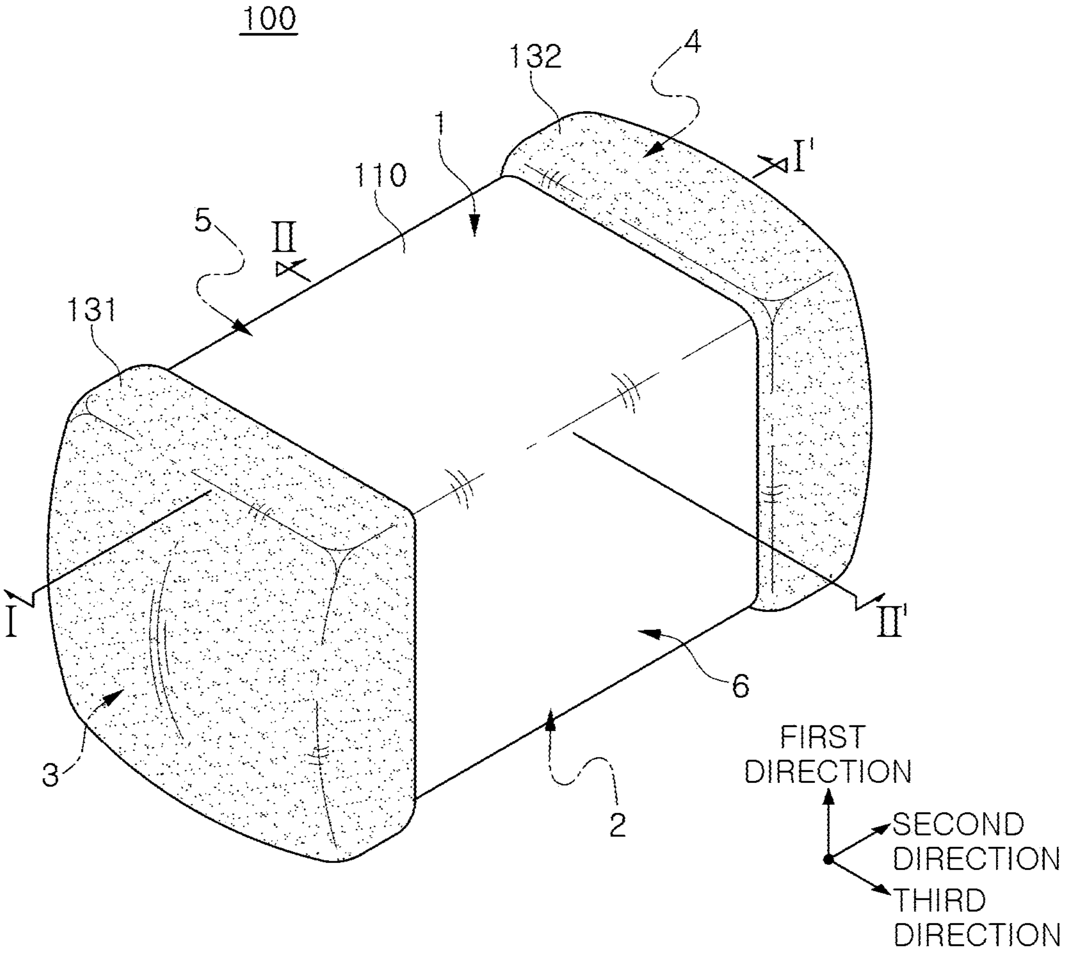
FIG. 1 is a perspective view schematically showing a multilayer electronic component according to an exemplary embodiment of the present disclosure.

Hereinafter, exemplary embodiments of the present disclosure will now be described in detail with reference to the accompanying drawings. The exemplary embodiments of the present disclosure may be modified in many different forms and the scope of the present disclosure should not be limited to the exemplary embodiments set forth herein. In addition, the exemplary embodiments of the present disclosure are provided to more fully explain the present disclosure to those skilled in the art. In the drawings, the shapes and dimensions may thus be exaggerated for clarity, and the same reference numerals are used to designate the same or like components.

Further, in the accompanying drawings, portions unrelated to the description will be omitted in order to clearly describe the present disclosure, and the size and thickness of each component shown in the drawings are arbitrarily shown for convenience of explanation. Therefore, the present disclosure is not necessarily limited to contents shown in the drawings. Furthermore, like reference numerals will be used to designate like components having similar functions throughout the drawings within the scope of the present disclosure. In addition, throughout the specification, when an element "includes" another component, it is to be understood that the element may further include a third component rather than excluding the third component, unless explicitly described to the contrary.

In the drawings, a first direction may indicate a thickness (T) direction, a second direction may indicate a length (L) direction, and a third direction may indicate a width (W) direction.

Multilayer Electronic Component

FIG. 1 is a perspective view schematically showing a multilayer electronic component according to an exemplary embodiment of the present disclosure.

Figure 2:
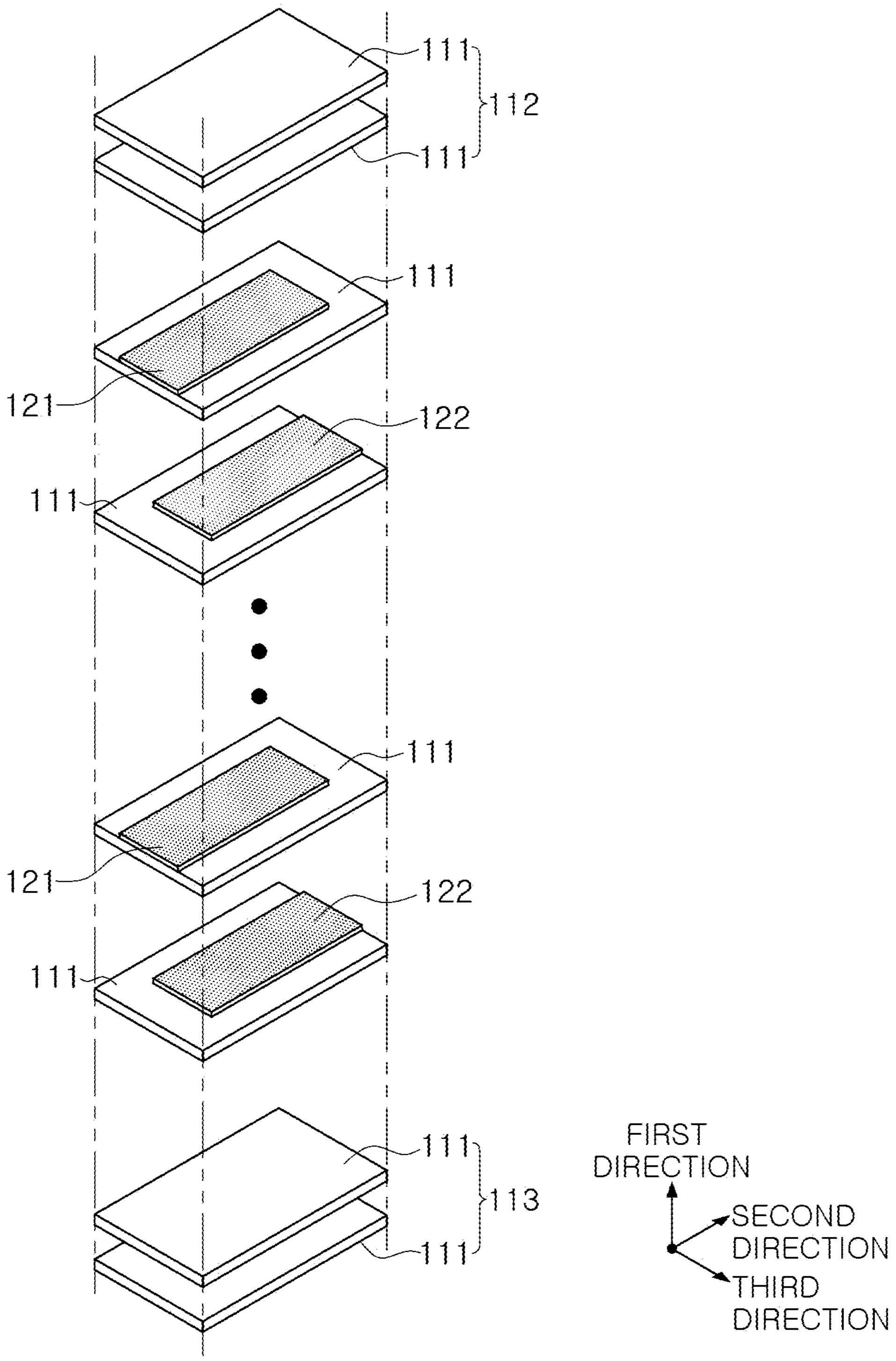
FIG. 2 is an exploded perspective view schematically showing a body of FIG. 1.

FIG. 2 is an exploded perspective view schematically showing a body of FIG. 1.

Figure 3:
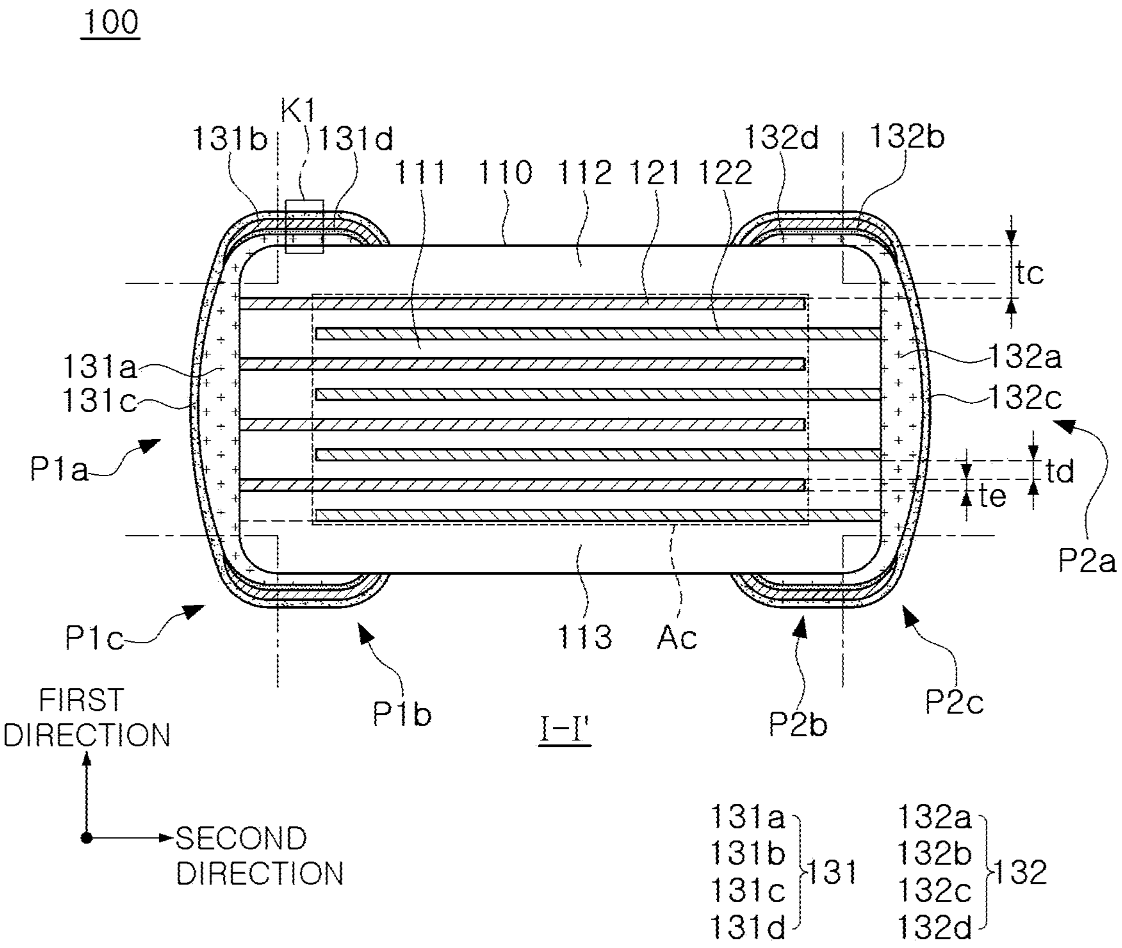
FIG. 3 is a cross-sectional view schematically showing section I-I' in FIG. 1.

FIG. 3 is a cross-sectional view schematically showing section I-I' in FIG. 1.

Figure 4:
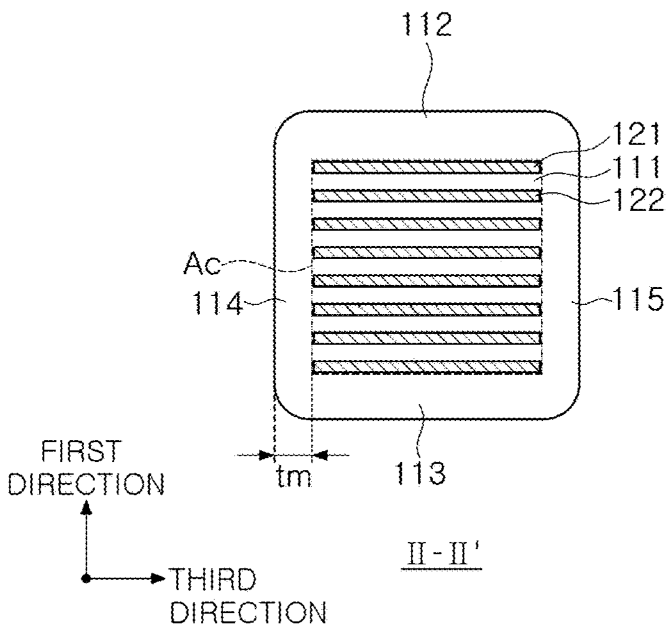
FIG. 4 is a cross-sectional view schematically showing section II-II' in FIG. 1.

FIG. 4 is a cross-sectional view schematically showing section II-II' in FIG. 1.

Figure 5:
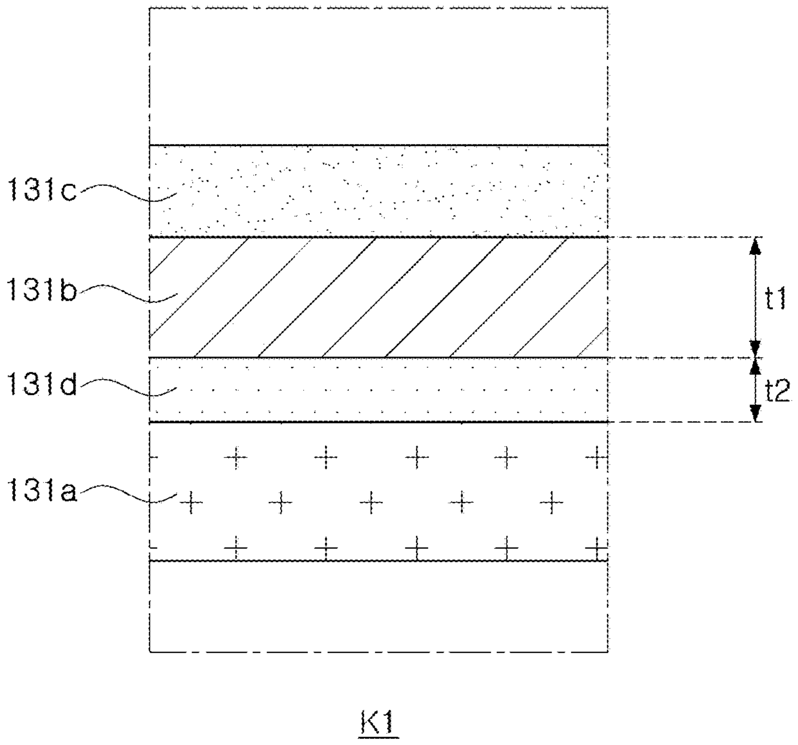
FIG. 5 is an enlarged view of region K1 in FIG. 3.

FIG. 5 is an enlarged view of region K1 in FIG. 3.

Hereinafter, a multilayer electronic component 100 according to an exemplary embodiment of the present disclosure is described with reference to FIGS. 1 through 5. In addition, a multilayer ceramic capacitor (MLCC) is described as an example of the multilayer electronic component, is not limited thereto, and may be applied to various multilayer electronic components, for example, an inductor, a piezoelectric element, a varistor, or a thermistor.

The multilayer electronic component 100 according to an exemplary embodiment of the present disclosure may include a body 110 including a dielectric layer 111 and internal electrodes 121 and 122, and external electrodes 131 and 132.

The body 110 is not particularly limited to a specific shape, and may have a hexahedral shape or a shape similar to the hexahedral shape, as shown in the drawings. The body 110 may not have a shape of the hexahedron having perfectly straight lines because a ceramic powder included in the body 110 is contracted during a process of sintering the body, or its edge may be polished. However, the body 110 may substantially have the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4, and opposing each other in the third direction.

The body 110 may include the dielectric layer 111 and the internal electrodes 121 and 122 alternately disposed while having the dielectric layer 111 interposed therebetween. The plurality of dielectric layers 111 included in the body 110 may already be sintered, and the adjacent dielectric layers 111 may thus be integrated with each other, thus making it difficult to confirm a boundary therebetween without using a scanning electron microscope (SEM).

The dielectric layer 111 may be formed by preparing a ceramic slurry including the ceramic powder, an organic solvent and a binder, applying the slurry to a carrier film and drying the same to prepare a ceramic green sheet, and then sintering the ceramic green sheet. The ceramic powder is not particularly limited as long as the capacitor acquires sufficient capacitance, and may use, for example, a barium titanate-based material, a lead composite perovskite-based material, or a strontium titanate-based material. The ceramic powder may be, for example, barium titanate ($BaTiO_3$) or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), in which calcium (Ca), zirconium (Zr) or the like is partially dissolved in $BaTiO_3$. The organic solvent may use ethanol or the like, the binder may use polyvinyl butyral or the like, and the organic solvent and the binder may use known materials used in the art.

The internal electrodes 121 and 122 may include, for example, the first internal electrode 121 and the second internal electrode 122 alternately disposed in the first direction while having the dielectric layer 111 interposed therebetween. That is, the first internal electrode 121 and the second internal electrode 122, which is a pair of electrodes having different polarities, may oppose each other while having the dielectric layer 111 interposed therebetween. The first internal electrode 121 and the second internal electrode 122 may be electrically insulated from each other by the dielectric layer 111 disposed therebetween.

The first internal electrode 121 may be spaced apart from the fourth surface 4 and may be connected to the first external electrode 131 on the third surface 3. The second internal electrode 122 may be spaced apart from the third surface 3 and may be connected to the second external electrode 132 on the fourth surface 4.

A conductive metal included in the internal electrode 121 or 122 may be at least one of nickel (Ni), copper (Cu), palladium (Pd), silver (Ag), gold (Au), platinum (Pt), tin (Sn), tungsten (W), titanium (Ti) and an alloy thereof, may include nickel (Ni), and is not limited thereto.

The internal electrode 121 or 122 may be formed by applying a conductive paste for an internal electrode that includes the conductive metal to a predetermined thickness on the ceramic green sheet and sintering the same. A method of printing the conductive paste for an internal electrode may be a screen-printing method, a gravure printing method, or the like, and the present disclosure is not limited thereto.

An average thickness td of the dielectric layers 111 and an average thickness the of the internal electrodes 121 or 122 may not need to be particularly limited. The average thickness td of the dielectric layers 111 and the average thickness of the internal electrodes 121 or 122 may be set arbitrarily based on a desired feature or purpose. However, in order to achieve the miniaturization and high capacitance of the multilayer electronic component 100, the average thickness td of the dielectric layers 111 may be 0.3 μm or more and 10 μm or less, and the average thickness the of the internal electrodes 121 or 122 may be 0.3 μm or more and 1 μm or less. In general, a reliability feature of the multilayer electronic component 100, such as its insulation resistance or breakdown voltage, may be lower as a thickness of the dielectric layer 111 or that of the internal electrode 121 or 122 is smaller. However, the reliability of the multilayer electronic component 100 according to an exemplary embodiment of the present disclosure may be secured by the external electrode 131 or 132 of the multilayer electronic component 100 that has a multilayer structure described below even when the average thickness td of the dielectric layers 111 and the average thickness the of the internal electrodes 121 or 122 satisfy the above range.

The average thickness td of the dielectric layers 111 and the average thickness the of the internal electrodes 121 or 122 may respectively indicate average sizes of the dielectric layers 111 and the internal electrodes 121 or 122 in the first direction. The average thickness td of the dielectric layer 111 and the average thickness the of the internal electrode 121 or 122 may be measured by scanning a cross section of the body 110 in a first-second direction by using a scanning electron microscope (SEM) at 10,000 magnification. In more detail, the average thickness td of the dielectric layers 111 may be acquired by measuring the thicknesses of the dielectric layer 111 at a plurality of points, for example, at thirty equally spaced points in the second direction, and then taking their average value. In addition, the average thickness the of the internal electrodes 121 or 122 may be acquired by measuring the thicknesses of the internal electrode 121 or 122 at a plurality of points, for example, at thirty equally spaced points in the second direction, and then taking their average value. The thirty equally spaced points may be specified in a capacitance formation portion Ac. Meanwhile, it is possible to acquire the more general average thickness td of the dielectric layers 111 and the more general average thickness the of the internal electrodes 121 or 122 when measuring each average value by extending a measurement target of the average value to ten dielectric layers 111 or ten internal electrodes 121 or 122.

The body 110 may include the capacitance formation portion Ac disposed in the body 110 and forming capacitance by including the first and second internal electrodes 121 and 122 alternately disposed while having the dielectric layer 111 interposed therebetween, and a first cover portion 112 and a second cover portion 113 disposed on both surfaces of the capacitance formation portion Ac that oppose each other in the first direction. The cover portion 112 or 113 may basically serve to prevent damage to the internal electrode that is caused by a physical or chemical stress. The cover portion 112 or 113 may have a configuration similar to that of the dielectric layer 111 except that the cover portion includes no internal electrode.

An average thickness tc of the cover portions 112 or 113 may not need to be particularly limited. The average thickness tc of the cover portions 112 or 113 may be 300 μm or less. Alternatively, the average thickness tc of the cover portions 112 or 113 may be 1% to 20% of the maximum size of the multilayer electronic component 100 in the first direction. Here, the average thickness tc of the cover portions 112 or 113 may indicate the average thickness of each of the first the cover portions 112 and the second the cover portions 113.

The average thickness tc of the cover portions 112 or 113 may indicate an average size of the cover portions 112 or 113 in the first direction, and may be an average value of their sizes in the first direction that are measured at five points equally spaced in the second direction in the cross section of the body 110 in the first-second direction, passing through the center of the body 110 in the third direction.

The body 110 may include a first margin portion 114 and a second margin portion 115 respectively disposed on both surfaces of the capacitance formation portion Ac that oppose each other in the third direction. That is, the margin portion 114 or 115 may indicate a region between each end of the internal electrode 121 or 122 and a boundary surface of the body 110 in a cross section of the body 110 that is cut in a first-third direction.

The margin portion 114 or 115 may have a configuration similar to that of the dielectric layer 111 except that the margin portion includes no internal electrode. The margin portion 114 or 115 may basically serve to prevent the internal electrode 121 or 122 from being damaged due to the physical or chemical stress.

The margin portion 114 or 115 may be formed by applying the conductive paste for an internal electrode on the ceramic green sheet except for its region the margin portion is to be formed and sintering the same. Alternatively, in order to suppress a step caused by the internal electrode 121 or 122, the margin portion 114 or 115 may be formed by cutting the stacked internal electrodes 121 and 122 to be exposed through the fifth and sixth surfaces 5 and 6 of the body, and then stacking one dielectric layer or two or more dielectric layers on both the surfaces of the capacitance formation portion Ac that oppose each other in the third direction.

An average thickness tm of the margin portions 114 or 115 may not need to be particularly limited. The average thickness tm of the margin portions 114 or 115 may be 400 μm or less. Alternatively, the average thickness tm of the margin portions 114 or 115 may be 1% to 15% of the maximum size of the multilayer electronic component 100 in the third direction. Here, the average thickness tm of the margin portions 114 or 115 may indicate an average thickness of each of the first margin portion 114 and the second margin portion 115.

The average thickness tm of the margin portions 114 or 115 may indicate an average size of the margin portions 114 or 115 in the third direction, and may be an average value of their sizes in the third direction that are measured at five points equally spaced in the first direction in the cross section of the body 110 in the first-third direction, passing through the center of the body 110 in the second direction.

The external electrode 131 or 132 may be disposed on the third or fourth surface 3 or 4 of the body 110, and extend to portions of the first, second, fifth and sixth surfaces 1, 2, 5, and 6. The external electrodes 131 and 132 may include the first external electrode 131 connected to the first internal electrode 121 and the second external electrode 132 connected to the second internal electrode 122. Hereinafter, the description describes a structure of the multilayer electronic component 100 having two external electrodes 131 and 132, the structure is not limited thereto, and the number or shape of the external electrodes 131 and 132 may be changed based on the shape or form of the internal electrode 121 or 122 or another purpose.

The external electrode 131 or 132 may include a connection portion P1*a* or P2*a* disposed on the third or fourth surface 3 or 4, and a band portion P1*b* or P2*b* extending from the connection portion P1*a* or P2*a* to portions of the first and second surfaces 1 and 2. The band portion P1*b* or P2*b* may extend to portions of the fifth or sixth surface 5 or 6 from the connection portion P1*a* or P2*a*. In addition, the external electrode 131 or 132 may include a corner portion P1*c* or P2*c* disposed between the connection portion P1*a* or P2*a* and the band portion P1*b* or P2*b*. The corner portion P1*c* or P2*c* may be disposed on the edge of the body 110.

That is, the first external electrode 131 may include the first connection portion P1*a* disposed on the third surface 3, the first band portion P1*b* extending onto portions of the first and second surfaces 1 and 2 from the first connection portion P1*a*, and the first corner portion P1*c* disposed between the first connection portion P1*a* and the first band portion P1*b*.

The second external electrode 132 may include the second connection portion P2*a* disposed on the fourth surface 4, the second band portion P2*b* extending onto portions of the first and second surfaces 1 and 2 from the second connection portion P2*a*, and the second corner portion P2*c* disposed between the second connection portion P2*a* and the second band portion P2*b*.

The external electrode 131 or 132 may include a lower electrode layer 131*a* or 132*a* in contact with the internal electrode 121 or 122 and disposed at the connection portion P1*a* or P2*a* and the band portion P1*b* or P2*b*, an intermediate electrode layer 131*b* or 132*b* disposed at the band portion P1*b* or P2*b* and disposed on the lower electrode layer 131*a* or 132*a*, and an upper electrode layer 131*c* or 132*c* in contact with the lower electrode layer 131*a* or 132*a* at the connection portion P1*a* or P2*a* and in contact with the intermediate electrode layer 131*b* or 132*b* at the band portion P1*b* or P2*b*. The upper electrode layer 131*c* or 132*c* may be disposed on the lower electrode layer 131*a* or 132*a* and the intermediate electrode layer 131*b* or 132*b*.

That is, the first external electrode 131 may include the first lower electrode layer 131*a* in contact with the first internal electrode 121 and disposed at the first connection portion P1*a* and the first band portion P1*b*, the first intermediate electrode layer 131*b* disposed at the first band portion P1*b* and disposed on the first lower electrode layer 131*a*, and the first upper electrode layer 131*c* in contact with the first lower electrode layer 131*a* at the first connection portion P1*a* and in contact with the first intermediate electrode layer 131*b* at the first band portion P1*b*.

The second external electrode 132 may include the second lower electrode layer 132*a* in contact with the second internal electrode 122 and disposed at the second connection portion P2*a* and the second band portion P2*b*, the second intermediate electrode layer 132*b* disposed at the second band portion P2*b* and disposed on the second lower electrode layer 132*a*, and the second upper electrode layer 132*c* in contact with the second lower electrode layer 132*a* at the second connection portion P2*a* and in contact with the second intermediate electrode layer 132*b* at the second band portion P2*b*.

The lower electrode layer 131*a* or 132*a* may include copper (Cu). In addition, the lower electrode layer 131*a* or 132*a* may include glass. Glass included in the lower electrode layer 131*a* or 132*a* may include one or more oxides of barium (Ba), calcium (Ca), zinc (Zn), aluminum (Al), boron (B), and silicon (Si), and is not limited thereto.

The lower electrode layer 131*a* or 132*a* may include a first metal including copper (Cu) as a main component thereof. Here, the fact that the first metal includes copper (Cu) as a main component thereof may indicate that a content of copper (Cu) in a total content (at %) of elements included in the first metal is more than 50 at %.

The lower electrode layer 131*a* or 132*a* may include copper (Cu) as a main component thereof. For example, a ratio of an area occupied by copper (Cu) to a total area of the lower electrode layer 131*a* or 132*a* may be 80% or more when analyzing a cross section of the multilayer electronic component 100 in the first-second direction, passing through the center of the multilayer electronic component 100 in the third direction, by using the scanning electron microscopy (SEM) and energy dispersive spectroscopy (EDS). For example, the ratio of the area occupied by copper (Cu) to the total area of the lower electrode layer 131*a* or 132*a* may be greater than a ratio of an area occupied by an element other than copper (Cu) to the total area of the lower electrode layer 131*a* or 132*a*, in the cross section of the multilayer electronic component 100 in the first-second direction, passing through the center of the multilayer electronic component 100 in the third direction. Here, the total area of the lower electrode layer 131*a* or 132*a* may indicate the total area occupied by the lower electrode layer 131*a* or 132*a* in an image analyzed by the SEM-EDS. The image may be an image showing the entire lower electrode layer 131*a* or 132*a*, or may be an enlarged image of a portion of the lower electrode layer 131*a* or 132*a*. Meanwhile, copper (Cu) may be detected in the lower electrode layer 131*a* or 132*a*, and silver (Ag) may not be detected therein when performing the analysis by using the energy dispersive spectroscopy (EDS).

Copper (Cu), which is a metal component included in the lower electrode layer 131*a* or 132*a*, may serve to electrically connect the internal electrode 121 or 122 and the external electrode 131 or 132 to each other. Glass included in the lower electrode layer 131*a* or 132*a* may serve to improve a density of the lower electrode layer 131*a* or 132*a*. The lower electrode layer 131*a* or 132*a* may be formed by dipping the third or fourth surface 3 or 4 of the body 110 into the conductive paste for a lower electrode layer that includes a copper (Cu) powder, glass, the binder, the organic solvent, or the like, and then sintering the conductive paste for a lower electrode layer.

The intermediate electrode layer 131*b* or 132*b* may include silver (Ag). In addition, the intermediate electrode layer 131*b* or 132*b* may include glass. Glass included in the intermediate electrode layer 131*b* or 132*b* may include one or more oxides of barium (Ba), calcium (Ca), zinc (Zn), aluminum (Al), boron (B), and silicon (Si), and is not limited thereto.

The intermediate electrode layer 131*b* or 132*b* may include a second metal including silver (Ag) as a main component thereof. Here, the fact that the second metal includes silver (Ag) as a main component thereof may indicate that a content of silver (Ag) in a total content (at %) of elements included in the second metal is more than 50 at %.

The intermediate electrode layer 131*b* or 132*b* may include silver (Ag) as a main component thereof. For example, a ratio of an area occupied by silver (Ag) to a total area of the intermediate electrode layer 131*b* or 132*b* may be 80% or more when analyzing the cross section of the multilayer electronic component 100 in the first-second direction, passing through the center of the multilayer electronic component 100 in the third direction, by using the scanning electron microscopy (SEM) and the energy dispersive spectroscopy (EDS). For example, the ratio of the area occupied by silver (Ag) to the total area of the intermediate electrode layer 131*b* or 132*b* may be greater than a ratio of an area occupied by an element other than silver (Ag) to the total area of the intermediate electrode layer 131*b* or 132*b*, in the cross section of the multilayer electronic component 100 in the first-second direction, passing through the center of the multilayer electronic component 100 in the third direction. Here, the total area of the intermediate electrode layer 131*b* or 132*b* may indicate the total area occupied by the intermediate electrode layer 131*b* or 132*b* in the image analyzed by the SEM-EDS. The image may be an image showing the entire intermediate electrode layer 131*b* or 132*b*, or may be an enlarged image of a portion of the intermediate electrode layer 131*b* or 132*b*. Meanwhile, silver (Ag) may be detected in the intermediate electrode layer 131*b* or 132*b*, and copper (Cu) may not be detected therein when performing the analysis by using the energy dispersive spectroscopy (EDS).

The intermediate electrode layer 131*b* or 132*b* is basically disposed at the band portion P1*b* or P2*b* of the external electrode 131 or 132 to thus serve to improve a bending strength of the multilayer electronic component 100. A method of forming the intermediate electrode layer 131*b* or 132*b* may not need to be particularly limited. For example, the intermediate electrode layer 131*b* or 132*b* may be formed by dipping the body 110, in which the lower electrode layer 131*a* or 132*a* is formed, into a conductive paste for an intermediate electrode layer that includes a silver (Ag) powder, glass, the binder, the organic solvent, or the like, removing the paste for an intermediate electrode layer that is applied to the connection portion P1*a* or P2*a*, and then sintering the paste for an intermediate electrode layer that is applied to the band portion P1*b* or P2. A sintering process to form the intermediate electrode layer 131*b* or 132*b* may be performed at a temperature of 300° C. or more and 800° C. or less, and is not limited thereto.

A type of the upper electrode layer 131*c* or 132*c* may not need to be particularly limited. The upper electrode layer 131*c* or 132*c* may be, for example, a plating layer to improve a mounting feature of the multilayer electronic component. The upper electrode layer 131*c* or 132*c* may be, for example, a plating layer including nickel (Ni), tin (Sn), palladium (Pd), and/or an alloy including the same, and may include a plurality of layers. The upper electrode layer 131*c* or 132*c* may be, for example, a nickel (Ni) plating layer or a tin (Sn) plating layer. The upper electrode layer 131*c* or 132*c* may include the nickel (Ni) plating layer and the Sn plating layer disposed on the Ni plating layer.

For example, the upper electrode layer 131*c* or 132*c* may be formed using electrolytic plating and/or electroless plating, and is not limited thereto.

Meanwhile, an alloy layer 131*d* or 132*d* including a copper (Cu)-silver (Ag) alloy may be disposed at an interface between the lower electrode layer 131*a* or 132*a* and the intermediate electrode layer 131*b* or 132*b*. That is, the first external electrode 131 may include the first alloy layer 131*d* disposed at the interface between the first lower electrode layer 131*a* and the first intermediate electrode layer 131*b*. The second external electrode 132 may include the second alloy layer 132*d* disposed at the interface between the second lower electrode layer 132*a* and the second intermediate electrode layer 132*b*. The alloy layer 131*d* or 132*d* may be formed by a mutual reaction between copper (Cu) in the lower electrode layer 131*a* or 132*a* and silver (Ag) in the intermediate electrode layer 131*b* or 132*b* when the intermediate electrode layer 131*b* or 132*b* is formed by sintering the conductive paste. The alloy layer 131*d* or 132*d* may be disposed continuously or discontinuously at the interface between the lower electrode layer 131*a* or 132*a* and the intermediate electrode layer 131*b* or 132*b*.

The Cu—Ag alloy included in the alloy layer 131*d* or 132*d* may include oxygen (O). Copper (Cu), silver (Ag), and oxygen (O) may be detected together in the alloy layer 131*d* or 132*d* when performing the analysis thereon by using the energy dispersive spectroscopy (EDS). In an exemplary embodiment, a molar ratio (Cu/Ag) of copper (Cu) to silver (Ag) may be 5 or more and 60 or less in at least some regions of the alloy layer 131*d* or 132*d*.

Each of the lower electrode layer 131*a* or 132*a* and the intermediate electrode layer 131*b* or 132*b* may be formed by sintering the conductive paste and include a number of pores, and the alloy layer formed by the reaction between the lower electrode layer 131*a* or 132*a* and the intermediate electrode layer 131*b* or 132*b* may also include the pores. However, in an exemplary embodiment, an average size of the pores included in the alloy layer 131*d* or 132*d* may be smaller than an average size of the pores included in the intermediate electrode layer 131*b* or 132*b*. In addition, an average size of the pores included in the alloy layer 131*d* or 132*d* may be smaller than the average size of the pores included in the lower electrode layer 131*a* or 132*a*. The alloy layer 131*d* or 132*d* may have a higher density than the lower electrode layer 131*a* or 132*a* or the intermediate electrode layer 131*b* or 132*b*, thus effectively preventing external moisture or plating solution from penetrating into the body 110. In addition, the alloy layer 131*d* or 132*d* may be disposed at the band portion P1*b* or P2*b* to thus improve the bending strength of the multilayer electronic component 100.

Meanwhile, the alloy layer 131*d* or 132*d* may prevent the external moisture penetration and improve the bending strength of the multilayer electronic component 100. However, when the alloy layer 131*d* or 132*d* completely covers the lower electrode layer 131*a* or 132*a*, the multilayer electronic component 100 may have lower capacitance and higher ESR due to its increased resistance. On the other hand, according to an exemplary embodiment of the present disclosure, the lower electrode layer 131*a* or 132*a* and the upper electrode layer 131*c* or 132*c* may be in contact with each other at the connection portion P1*a* or P2*a* to thus reduce the resistance caused by the alloy layer 131*d* or 132*d*, thereby improving an electrical feature of the multilayer electronic component 100.

A thickness of the alloy layer 131*d* or 132*d* may not need to be particularly limited. However, in an exemplary embodiment, t1>t2 where t1 indicates a thickness of the intermediate electrode layer 131*b* or 132*b* that is measured in its central region in the second direction, and t2 indicates the thickness of the alloy layer 131*d* or 132*d* that is measured in its central region in the second direction, in the cross section of the multilayer electronic component 100 in the first-second direction, passing through the center of the body 110 in the third direction. That is, the thickness of the intermediate electrode layer 131*b* or 132*b* at the band portion P1*b* or P2*b* may be greater than the thickness of the alloy layer 131*d* or 132*d*. t1 and t2 may not need to be particularly limited, and t1 may be 1 μm to 100 μm, and t2 may be 0.01 μm to 50 μm.

It is sufficient when the intermediate electrode layer 131*b* or 132*b* is disposed at the band portion P1*b* or P2*b*, and a specific structure of the intermediate electrode layer 131*b* or 132*b* may be changed based on a desired feature of the multilayer electronic component 100.

In an exemplary embodiment, the intermediate electrode layer 131*b* or 132*b* may cover an end of the lower electrode layer 131*a* or 132*a* at the band portion P1*b* or P2*b*. In this way, the alloy layer 131*d* or 132*d* may be disposed on the end of the lower electrode layer 131*a* or 132*a*. The alloy layer 131*d* or 132*d* may cover the end of the lower electrode layer 131*a* or 132*a*, which may be an external moisture penetration path, thereby more effectively improving the moisture resistance reliability of the multilayer electronic component 100.

In an exemplary embodiment, the intermediate electrode layer 131*b* or 132*b* may have one end disposed at the corner portion P1*c* or P2*c*. That is, one end of the first intermediate electrode layer 131*b* may be disposed at the first corner portion P1*c*, and one end of the second intermediate electrode layer 131*c* may be disposed at the second corner portion P2*c*. In this way, one end of the alloy layer 131*d* or

132*d* may be disposed at the corner portion P1*c* or P2*c*. The alloy layer 131*d* or 132*d* may have one end disposed at the corner portion P1*c* or P2*c*, thereby effectively preventing the external moisture from penetrating into the edge of the body 110 that is vulnerable to the moisture penetration.

In an exemplary embodiment, the intermediate electrode layer 131*b* or 132*b* may not be disposed at the connection portion P1*a* or P2*a*. In this way, it is possible to secure a sufficient bonding area between the lower electrode layer 131*a* or 132*a* and the upper electrode layer 131*c* or 132*c* to thus reduce the resistance caused by the formation of the alloy layer 131*d* or 132*d*, thereby effectively improving the electrical feature of the multilayer electronic component 100.

Figure 6:
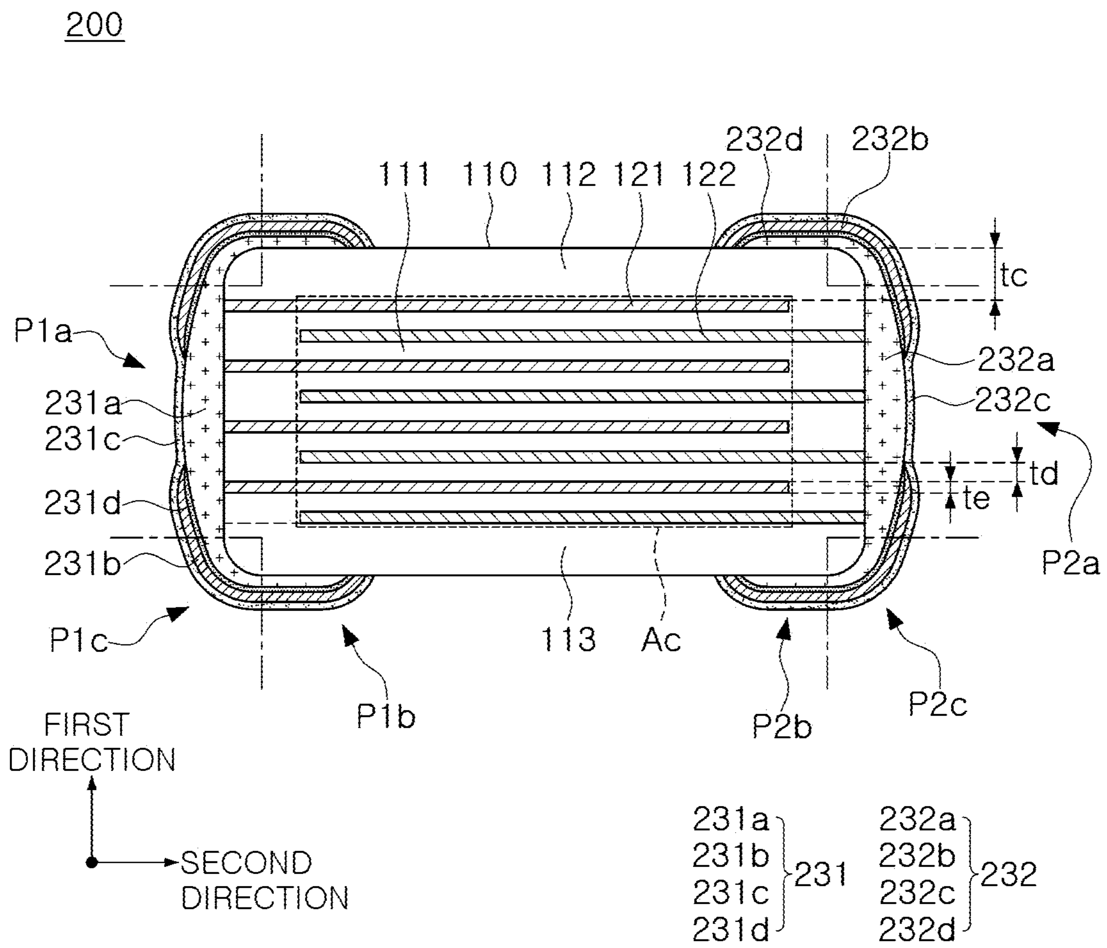
FIG. 6 is a modified example of FIG. 3, and is a cross-sectional view schematically showing a multilayer electronic component according to another exemplary embodiment of the present disclosure.

FIG. 6 is a modified example of FIG. 3, and is a cross-sectional view schematically showing a multilayer electronic component 200 according to another exemplary embodiment of the present disclosure. Hereinafter, the description describes the multilayer electronic component 200 according to another exemplary embodiment of the present disclosure with reference to FIG. 6, and omits its description overlapping that of the multilayer electronic component 100 according to an exemplary embodiment of the present disclosure described above.

The multilayer electronic component 200 according to another exemplary embodiment of the present disclosure may include the body 110 and first and second external electrodes 231 and 232.

The first external electrode 231 may include a first lower electronic layer 231*a* in contact with the first internal electrode 121 and disposed at the first connection portion P1*a* and the first band portion P1*b*, a first intermediate electrode layer 231*b* disposed on the first lower electrode layer 231*a* and extending to a portion of the first connection portion P1*a* from the first band portion P1*b*, and a first upper electrode layer 231*c* in contact with the first lower electrode layer 231*a* at the first connection portion P1*a* and in contact with the first intermediate electrode layer 231*b* at the first band portion P1*b*.

The second external electrode 232 may include a second lower electronic layer 232*a* in contact with the second internal electrode 122 and disposed at the second connection portion P2*a* and the second band portion P2*b*, a second intermediate electrode layer 232*b* disposed on the second lower electrode layer 232*a* and extending to a portion of the second connection portion P2*a* from the second band portion P2*b*, and a second upper electrode layer 232*c* in contact with the second lower electrode layer 232*a* at the second connection portion P2*a* and in contact with the second intermediate electrode layer 232*b* at the second band portion P2*b*.

The first external electrode 231 may include a first alloy layer 231*d* including the Cu—Ag alloy and disposed at an interface between the first lower electrode layer 231*a* and the first intermediate electrode layer 231*b*. The second external electrode 232 may include a second alloy layer 232*d* including the Cu—Ag alloy and disposed at an interface between the second lower electrode layer 232*a* and the second intermediate electrode layer 232*b*.

In the multilayer electronic component 200 according to an exemplary embodiment of the present disclosure, the intermediate electrode layer 231*b* or 232*b* may have one end disposed at the connection portion P1*a* or P2*a*. That is, one end of the first intermediate electrode layer 231*b* may be disposed at the first connection portion P1*a*, and one end of the second intermediate electrode layer 232*b* may be disposed at the second connection portion P2*a*. In addition, the first intermediate electrode layer 231*b* may cover an end of the first lower electrode layer 231*a* at the first band portion P1*b*, and the second intermediate electrode layer 232*b* may cover an end of the second lower electrode layer 232*a* at the second band portion P2*b*.

Accordingly, the alloy layer 231*d* or 232*d* may partially cover the lower electrode layer 231*a* or 232*a* at the connection portion P1*a* or P2*a*, cover the lower electrode layer 231*a* or 232*a* at the corner portion P1*c* or P2*c*, and cover even the end of the lower electrode layer 231*a* or 232*a* at the band portion P1*b* or P2*b*, thereby effectively improving moisture resistance reliability of the multilayer electronic component 200.

In addition, the lower electrode layer 231*a* or 232*a* and the upper electrode layer 231*c* or 232*c* may be in contact with each other at the connection portion P1*a* or P2*a*, thereby improving an electrical feature of the multilayer electronic component 200.

The intermediate electrode layer 231*b* or 232*b* may be formed by dipping the body 110, on which the lower electrode layers 231*a* or 232*a* are formed, into the conductive paste for an intermediate electrode layer, removing some of the conductive paste for an intermediate electrode layer that is applied to the central region of the connection portion P1*a* or P2*a* among the conductive paste for an intermediate electrode layer that is applied to the connection portion P1*a* or P2*a*, and then sintering the paste for an intermediate electrode layer.

Figure 7:
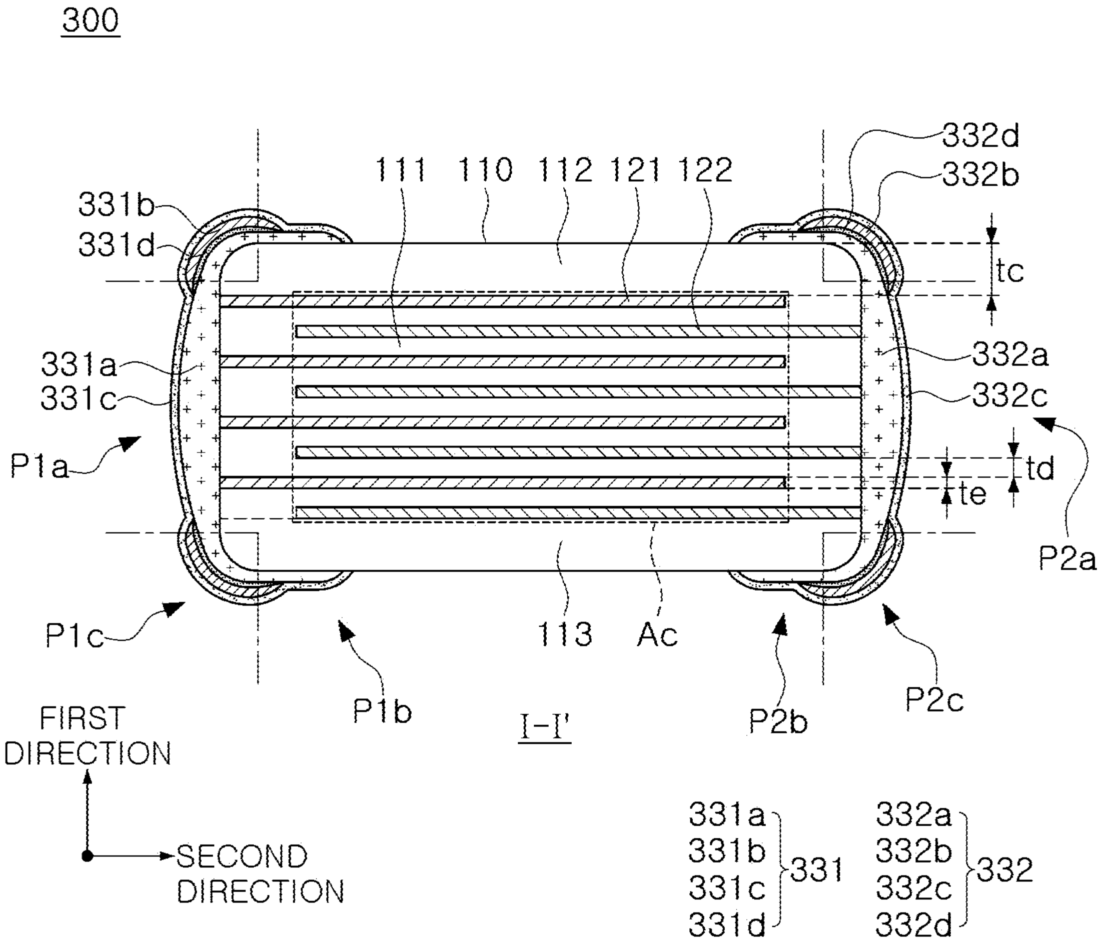
FIG. 7 is a modified example of FIG. 3, and is a cross-sectional view schematically showing a multilayer electronic component according to another exemplary embodiment of the present disclosure.

FIG. 7 is a modified example of FIG. 3, and is a cross-sectional view schematically showing a multilayer electronic component 300 according to another exemplary embodiment of the present disclosure. Hereinafter, the description describes the multilayer electronic component 300 according to another exemplary embodiment of the present disclosure with reference to FIG. 7, and omits its description overlapping that of the multilayer electronic component 100 according to an exemplary embodiment of the present disclosure described above.

The multilayer electronic component 300 according to another exemplary embodiment of the present disclosure may include the body 110 and first and second external electrodes 331 and 332.

The first external electrode 331 may include a first lower electrode layer 331*a* in contact with the first internal electrode 121 and disposed at the first connection portion P1*a* and the first band portion P1*b*, a first intermediate electrode layer 331*b* disposed on the first lower electrode layer 331*a*, disposed at the first corner portion P1*c*, and extending to portions of the first connection portion P1*a* and the first band portion P1*b*, and a first upper electrode layer 331*c* in contact with the first lower electrode layer 331*a* at the first connection portion P1*a*, in contact with the first intermediate electrode layer 331*b* at the first corner portion P1*c*, and in contact with the first lower electrode layer 331*a* at the first band portion P1*b*.

The second external electrode 332 may include a second lower electrode layer 332*a* in contact with the second internal electrode 122 and disposed at the second connection portion P2*a* and the second band portion P2*b*, a second intermediate electrode layer 332*b* disposed on the second lower electrode layer 332*a*, disposed at the second corner portion P2*c*, and extending to portions of the second connection portion P2*a* and the second band portion P2*b*, and a second upper electrode layer 332*c* in contact with the second lower electrode layer 332*a* at the second connection portion P2*a*, in contact with the second intermediate electrode layer

332*b* at the second corner portion P2*c*, and in contact with the second lower electrode layer 332*a* at the second band portion P2*b*.

The first external electrode 331 may include a first alloy layer 331*d* including the Cu—Ag alloy and disposed at an interface between the first lower electrode layer 331*a* and the first intermediate electrode layer 331*b*. The second external electrode 332 may include a second alloy layer 332*d* including the Cu—Ag alloy and disposed at an interface between the second lower electrode layer 332*a* and the second intermediate electrode layer 332*b*.

In the multilayer electronic component 300 according to an exemplary embodiment of the present disclosure, the alloy layer 331*d* or 332*d* may cover the lower electrode layer 331*a* or 332*a* at the corner portion P1*c* or P2*c*, and partially cover the lower electrode layer 331*a* or 332*a* at the connection portion P1*a* or P2*a* and the band portion P1*b* or P2*b*, thereby effectively improving moisture resistance reliability of the multilayer electronic component 300.

In addition, the lower electrode layer 331*a* or 332*a* and the upper electrode layer 331*c* or 332*c* may be in contact with each other at the connection portion P1*a* or P2*a*, and the end of the lower electrode layer 331*a* or 332*a* may be in contact with the upper electrode layer 331*c* or 332*c* at the band portion P1*b* or P2*b*. In this way, it is possible to effectively improve an electrical feature of the multilayer electronic component 300.

The intermediate electrode layer 331*b* or 332*b* may be formed by forming the lower electrode layer 331*a* or 332*a*, then applying the conductive paste for an intermediate electrode layer to the corner portion P1*c* or P2*c* of the external electrode 331 or 332, and sintering the same.

As set forth above, according to the exemplary embodiments of the present disclosure, the multilayer electronic component may have the improved moisture resistance reliability and bending strength.

The multilayer electronic component according to the present disclosure may have the improved capacitance and equivalent series resistance (ESR) feature.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:

a body including a dielectric layer and internal electrodes alternately disposed while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction;

an external electrode including a connection portion disposed on the third or fourth surface and a band portion extending onto portions of the first and second surfaces from the connection portion, wherein the external electrode includes a lower electrode layer in contact with a corresponding internal electrode and disposed at the connection portion and the band portion, an intermediate electrode layer disposed at the band portion and disposed on the lower electrode layer, and an upper electrode layer in contact with the lower electrode layer at the connection portion and in contact with the intermediate electrode layer at the band portion, the lower electrode layer includes copper (Cu), the intermediate electrode layer includes silver (Ag), and an alloy layer including a copper (Cu)-silver (Ag) alloy is disposed at an interface between the lower electrode layer and the intermediate electrode layer.

2. The multilayer electronic component according to claim 1, wherein an average size of pores included in the alloy layer is smaller than an average size of pores included in the intermediate electrode layer.

3. The multilayer electronic component according to claim 1, wherein t1>t2 where t1 indicates a thickness of the intermediate electrode layer that is measured in its central region in the second direction, and t2 indicates a thickness of the alloy layer that is measured in its central region in the second direction, in a cross section of the multilayer electronic component in a first-second direction, passing through a center of the body in the third direction.

4. The multilayer electronic component according to claim 1, wherein a molar ratio (Cu/Ag) of copper (Cu) to silver (Ag) is 5 or more and 60 or less in at least some regions of the alloy layer.

5. The multilayer electronic component according to claim 1, wherein the lower electrode layer includes copper (Cu) as a main component thereof, and the intermediate electrode layer includes silver (Ag) as a main component thereof.

6. The multilayer electronic component according to claim 1, wherein each of the lower electrode layer and the intermediate electrode layer includes glass.

7. The multilayer electronic component according to claim 1, wherein the upper electrode layer includes a nickel (Ni) plating layer and a tin (Sn) plating layer disposed on the Ni plating layer.

8. The multilayer electronic component according to claim 1, wherein the intermediate electrode layer covers an end of the lower electrode layer at the band portion.

9. The multilayer electronic component according to claim 1, wherein the external electrodes include a corner portion disposed between the connection portion and the band portion, and the intermediate electrode layer has one end disposed at the corner portion.

10. The multilayer electronic component according to claim 1, wherein the intermediate electrode layer is not disposed at the connection portion.

11. The multilayer electronic component according to claim 1, wherein the intermediate electrode layer has one end disposed at the connection portion.

12. The multilayer electronic component according to claim 1, wherein the external electrodes include a corner portion disposed between the connection portion and the band portion, and the intermediate electrode layer is disposed at the corner portion and extends to portions of the connection portion and the band portion.

13. A multilayer electronic component comprising:

a body including a dielectric layer and internal electrodes alternately disposed while having the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction;

an external electrode including a connection portion disposed on the third or fourth surface and a band portion extending onto portions of the first and second surfaces from the connection portion, wherein the external electrode includes a lower electrode layer in contact with a corresponding internal electrode and disposed at the connection portion and the band portion, an intermediate electrode layer disposed at the band portion and disposed on the lower electrode layer, and an upper electrode layer in contact with the lower electrode layer at the connection portion and in contact with the intermediate electrode layer at the band portion, the lower electrode layer includes a first metal including copper (Cu) as a main component thereof, and the intermediate electrode layer includes a second metal including silver (Ag) as a main component thereof.

14. The multilayer electronic component according to claim 13, wherein an alloy layer including a copper (Cu)-silver (Ag) alloy is disposed at an interface between the lower electrode layer and the intermediate electrode layer, and an average size of pores included in the alloy layer is smaller than an average size of pores included in the intermediate electrode layer.

15. The multilayer electronic component according to claim 14, wherein t1>t2 where t1 indicates a thickness of the intermediate electrode layer that is measured in its central region in the second direction, and t2 indicates a thickness of the alloy layer that is measured in its central region in the second direction, in a cross section of the multilayer electronic component in a first-second direction, passing through a center of the body in the third direction.

16. The multilayer electronic component according to claim 14, wherein a molar ratio (Cu/Ag) of copper (Cu) to silver (Ag) is 5 or more and 60 or less in at least some regions of the alloy layer.

17. The multilayer electronic component according to claim 13, wherein each of the lower electrode layer and the intermediate electrode layer includes glass.

18. The multilayer electronic component according to claim 13, wherein the upper electrode layer includes a nickel (Ni) plating layer and a tin (Sn) plating layer disposed on the Ni plating layer.

19. The multilayer electronic component according to claim 13, wherein the intermediate electrode layer covers an end of the lower electrode layer at the band portion.

20. The multilayer electronic component according to claim 13, wherein the external electrode includes a corner portion disposed between the connection portion and the band portion, and the intermediate electrode layer has one end disposed at the corner portion.

21. The multilayer electronic component according to claim 13, wherein the intermediate electrode layer is not disposed at the connection portion.

22. The multilayer electronic component according to claim 13, wherein the intermediate electrode layer has one end disposed at the connection portion.

23. The multilayer electronic component according to claim 13, wherein the external electrode includes a corner portion disposed between the connection portion and the band portion, and the intermediate electrode layer is disposed at the corner portion and extends to portions of the connection portion and the band portion.

24. A multilayer electronic component, comprising:

a body including internal electrodes and dielectric layers stacked alternately in a thickness direction;

an external electrode comprising a band portion disposed on surfaces of the body opposing in the thickness direction and a connection portion disposed on a surface connecting thickness-wise opposing surfaces of the body, wherein the external electrode includes:

a lower layer comprising copper, contacts an internal electrode at the connection portion and extends to the band portion, an intermediate layer comprising silver, disposed on the lower layer in the band portion, an alloy layer comprising a copper-silver alloy disposed at an interface between the lower layer and the intermediate layer in the band portion, and an upper layer contacting the intermediate layer in the band portion and contacting the lower layer in the connection portion.

* * * * *